Figure 1:
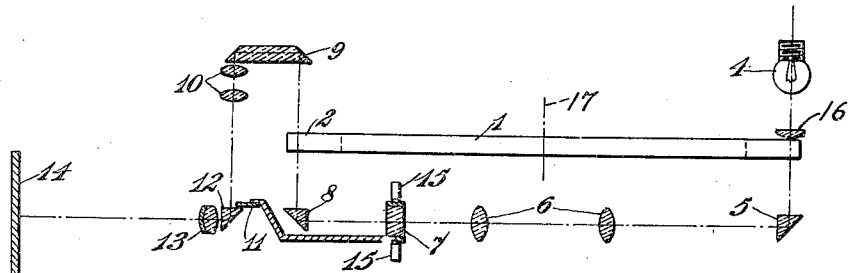

Aug. 30, 1949.                    C. J. GODFREY ET AL                    2,480,237
                            OPTICAL DEVICE FOR ACCURATE
                              READING OF ANNULAR SCALES
                                  Filed Jan. 7, 1947

Inventors
C. J. Godfrey
V. W. H. Towns
By Glascock Downing Ruble
            Attys.

Patented Aug. 30, 1949

2,480,237

UNITED STATES PATENT OFFICE 2,480,237

OPTICAL DEVICE FOR ACCURATE READING OF ANNULAR SCALES

Charles John Godfrey and Victor William Henry Towns, London, England, assignors, by mesne assignments, to Hilger & Watts Limited, London, England Application January 7, 1947, Serial No. 720,662
In Great Britain September 14, 1945

4 Claims. (Cl. 88—1)

This invention relates to machine tools having circular tables with a scale thereon in the form of a divided circle, and the invention has for its object to provide an improved method of reading such scale or divided circle which avoids the errors of customary methods employing one reading index, vernier, or microscope at one point only of the circular scale of the machine tool.

The increased accuracy demanded in modern machine tool practice has necessitated a change from mechanical scale reading devices to optical reading devices, but even with the employment of optical reading devices it is difficult to provide a pivot of sufficient accuracy, and to mount the graduated circle exactly concentric so that the point of rotation and point from which the graduations radiate are coincident.

It is obvious that to position any hole within a specified accuracy, the graduated circle must be divided and mounted within a corresponding accuracy. It is useless for instance to try to measure an angle to half minute when the machine itself is liable to an error of half minute. For example it may be desired to position a number of holes on a jig boring machine to .0001 in. situated on a radius of 10 in. from the centre of the work table. The maximum permissible angular error in this case is 2 secs. of arc. For larger diameters of work and higher orders of accuracy this permissible error becomes considerably smaller. The larger jig borer circular tables employed may be as large as 36 in. diameter, so that a tolerance of .0001 in. is equivalent to an angle of one second of arc. Now an optical circular table incorporating a glass circular scale of say 12 in. diameter read by means of a microscope at one reading point would require a divisional accuracy to within half a second and the pivot upon which the graduated circle is mounted would have to provide rotational accuracy to an amount within half a second i. e.

$$\frac{.0001 \times 12}{36} = .00003 \text{ in. or } 3/100,000 \text{ in.}$$

With a glass circle smaller than 12 in. diameter the divisional accuracy would have to be maintained while the accuracy of the pivot would be proportionally increased. In practice difficulty is experienced in making a pivot to provide accurate rotation, even after the most careful fitting and lapping.

The errors attributable therefore to the employment of a circular rotatable table with a divided circle or scale may be summarized as follows:

(1) Error due to irregularity of pivot.
(2) Eccentricity of graduations (centering of divided circle).
(3) Erratic error due to graduation errors.

The linear magnitude of all these errors is dependent upon the relationship between the diameter of the divided circle and the diameter of the circular work table.

According to the invention the above errors are compensated for by the employment of an optical system adapted to provide for the reading of the divided circle at two points 180° apart and to bring the scale images at the opposite points together in one reading eyepiece or on to a common projection screen.

Thus in accordance with the invention a machine tool or accessory having a circular table with a divided circle or scale and which is associated with and rotatable with a workpiece, said circular table being equipped with an optical system adapted to read two points on the divided circle 180° apart and to bring the images of the two points together in one reading eyepiece or onto a common projection screen whereby it is possible to obtain an arithmetic mean which eliminates the effects of eccentricity and averages the divisional errors. The errors attributable to the pivot are kept within limits of required accuracy by providing a graduated circle of sufficient relative diameter.

Various reading methods may be used as for example an arrangement providing for the two scale images running parallel to each other and in opposite directions, one scale image being a row of single lines, the other a row of double lines. By means of a suitable optical device the row of double lines are moved so as to straddle the row of single lines, such movement simultaneously moving a fine reading scale. The scale image of both divided circle and fine reading scales, seen in the one reading eyepiece or common projection screen, is numbered, thus providing for complete readings in degrees, minutes and decimals or degrees, minutes and seconds as required.

Another suitable method is one in which the scale images appear running parallel to each other and in opposite directions, both scale images being rows of single lines each being separated by a thin and almost invisible dividing line. In this method both scale images are usually moved in opposite directions simultaneously by the use of a suitable optical device which at the same time moves a fine reading scale. When making a "setting" the scale images are moved until the ends of the lines of the adjacent scale images are in coincidence.

By means of a suitable optical device similar to that used in the first method described above, the scale image may be moved and the amount indicated when setting the scale image on the fixed datum line.

The invention applies equally to other forms of circular scales on machine tools or accessories such as divided heads.

Figure 2:
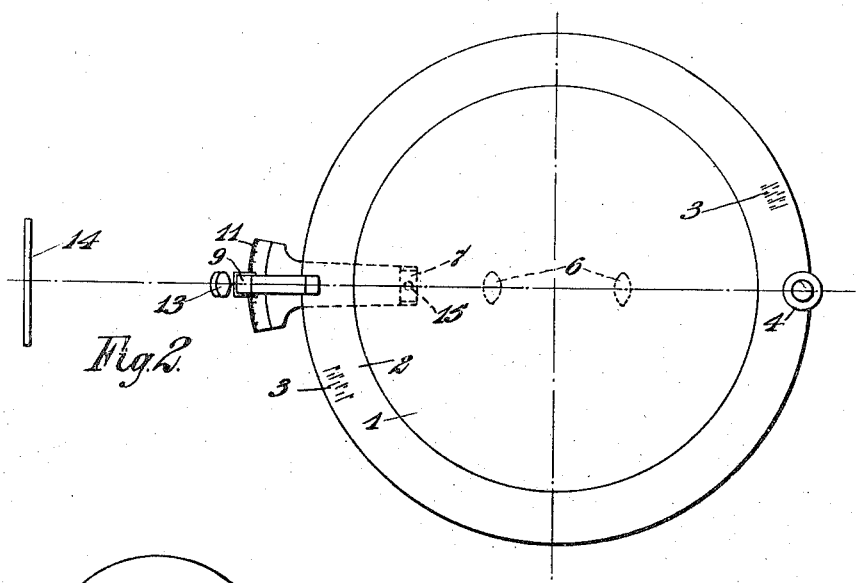
Figure 3:
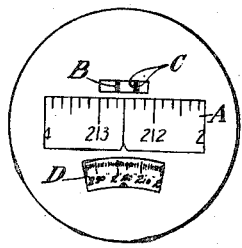
Figure 5:
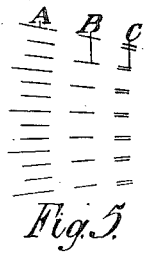
Figure 4:

In the accompanying drawings, which illustrate one mode of carrying the invention into effect, Figure 1 is a diagrammatic elevational view, Figure 2 is a plan view of Figure 1, Figure 3 shows an example of what would be seen in the field of view of the microscope, and Figures 4 and 5 are diagrams showing different forms of the scale employed in accordance with the invention, this scale being either a composite scale as exemplified in Figure 4 or three separate scales as exemplified in Figure 5.

Referring to the drawings, 1 represents the circular table of a machine tool or accessory, said table being rotatable about the axis 17 with the workpiece (not shown), said table being provided with a glass circle or ring 2 containing around one face thereof an annular scale 3 which is capable of being illuminated by a lamp 4 so that the light may pass via a lens 16 through the glass circle or ring at one point thereon onto a prism 5 and be deflected therefrom through the lenses 6 and a refractor block 7 onto another prism 8 in which an image of a portion of the scale at a point diametrically opposite another portion of the scale is imaged against or superimposed upon this last mentioned scale portion and from which the two scale images are then reflected through a further prism 9 and lenses 10 onto a fine reading scale 11, on the plane of which a magnified image of the scale graduations is formed. The thus imposed scale images, together with the fine reading scale graduations, are thence reflected through the prism 12 and through the final magnifying lens 13 to a screen 14, which latter however may be replaced by the eyepiece of a microscope common to the scale images.

The refractor block 7 is mounted upon needle bearings 15 for pivotal movement about a vertical axis so that pivotal adjustment of the refractor block can be effected to cause a displacement of the scale images of one side only of the circle, which displacement however is indicated on the fine reading scale 11.

Preferred forms of the scale divisions provided upon the glass circle or ring 2 are shown in Figures 4 and 5. In both forms the scale involves the provision essentially of three rows of graduations each of different spacing or of different type and these may be combined to form a composite scale as shown in Figure 4 or they may be formed as entirely separate scales as shown in Figure 5. In either case there is one row A of scale divisions which may be, for example, ten-minute divisions and the approximate position of which is read by means of an index line, another row B of say twenty-minute graduations and another row C also of twenty-minute graduations but composed essentially by double division lines as shown.

The optical system of the circular table selects that portion of the double line scale C which is diametrically opposite a portion of the scale B and reveals these two scale portions in superimposed relationship on the screen 14 or in the field of view of the microscope, in which latter the micrometer scale D is also seen, as is shown in Figure 3.

Light from lamp 4 passes through the circular scale 3 picking up an image of the C line of graduations. The optical system is so arranged at a greater radius that images of A and B graduations are not picked up at this point. This C image passes through prism 5 optical, system 6, refractor block 7. The refractor block 7 is capable of being rotated about pivots 15, the amount of this rotation being measured directly on an arc scale 11 shown in the field of view Figure 3 at D. The effect of tilting the refractor block is to laterally displace the image of C graduations.

The image of C passes through prism 8 and again passes through the scale 3 at a point diametrically opposite the point at which image C was picked up. This time images of A and B only are picked up but the image of C from the opposite side of the circle is superimposed onto the B graduations, i. e. at the same radius. The images of A, B and C then pass prism 9 lens, system 10, prism 12, optical system 13 and onto the screen 14. At the same time light passing through the system produces an image of arc scale 11, which measures the angular tilt of the refractor block 7, passing through prism 12 and optical system 13 and onto the screen to be viewed as at D in Figure 3.

The amount of movement on the refractor block 7 is just sufficient to laterally displace a C graduation an amount equal to the pitch of the B graduations. Therefore if, before taking any readings, the refractor block 7 is tilted until the C graduations appear symmetrically placed about the single B graduations, a datum is established and the amount of rotation of the block 7 as shown at D gives the subdivision of the main scale A.

We claim:

1. In a machine tool having a rotatable work table, a light source including optical means disposed on one side of said table to project light rays in a line parallel to the axis of rotation of the table, annularly arranged indicia means on said table disposed in the line of said light rays, a prism on the opposite side of said indicia means to said light source to receive and reflect the rays substantially parallel to the table and radially thereto, a second prism mounted on the same side of the table as the first mentioned prism to receive and reflect the rays of light through indicia means on the table diametrically opposite to the first mentioned indicia means, optical means in the line of said rays to focus an image of the first-mentioned indicia means in the plane of the second mentioned indicia means, a refractor block mounted in the line of the light rays between said indicia means rotatable about an axis parallel to the axis of the table to deflect the rays in planes parallel with the table to adjust the relative positions of the images of said indicia means, and means for viewing the images simultaneously.

2. A device of the character claimed in claim 1 in which the means for viewing the images simultaneously includes optical means for projecting said images on to a viewing screen.

3. In a machine tool having a rotatable work table, a light source including optical means disposed on one side of said table to project light rays in a line parallel to the axis of rotation of the table, annularly arranged indicia means on said table disposed in the line of said light rays, a prism on the opposite side of said indicia means to said light source to receive and reflect the rays substantially parallel to the table and radially thereto, a second prism mounted on the same side of the table as the first mentioned prism to receive and reflect the rays of light through indicia means on the table diametrically opposite to the first mentioned indicia means, optical means in the line of said rays to focus an image of the first-mentioned indicia means in the plane of the second mentioned indicia means, a refractor block mounted in the line of the light rays between said indicia means rotatable about an axis parallel to the axis of the table to deflect the rays in planes parallel with the table to adjust the relative positions of the images of said indicia means, a fine reading scale operatively connected with the said refractor block to indicate the angle by which the rays are deflected from the normal by the block, and means for viewing the images in combination and simultaneously.

4. A device of the character claimed in claim 3 in which the means for viewing the images in combination and simultaneously includes optical means for projecting said images on to a viewing screen.

CHARLES JOHN GODFREY.
VICTOR WILLIAM HENRY TOWNS.

REFERENCES CITED

The following references are of record in the file of this patent:

UNITED STATES PATENTS

| Number | Name | Date |
| --- | --- | --- |
| 1,502,223 | Abraham | July 22, 1924 |
| 1,721,398 | Jacob | July 16, 1929 |
| 1,754,872 | Baker et al. | Apr. 15, 1930 |
| 2,221,317 | Wild | Nov. 12, 1940 |